United States Patent Office 2,901,906
Patented Sept. 1, 1959

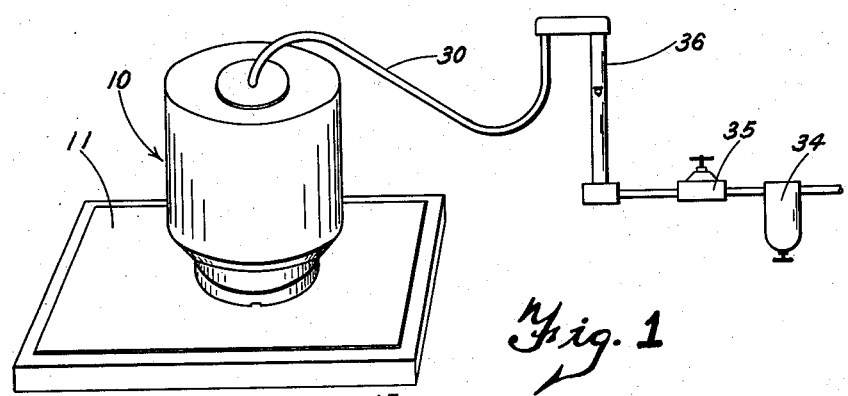
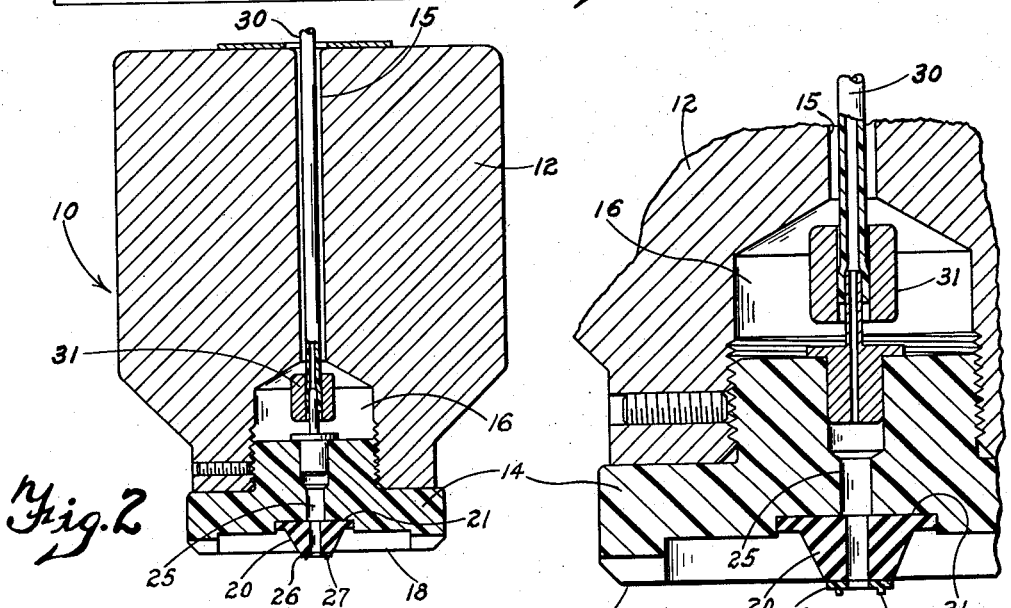
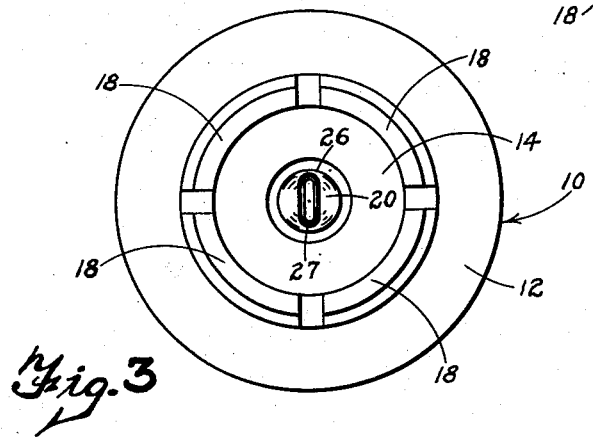
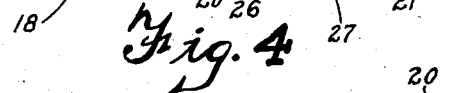

2,901,906

DEVICE FOR GAUGING SURFACE CHARACTERISTICS

Nelson Emmons III, Dayton, Ohio, assignor, by mesne assignments, to The Sheffield Corporation, a corporation of Delaware Application March 24, 1955, Serial No. 496,489

4 Claims. (Cl. 73—37)

This invention relates to gauging devices and more particularly to a gauging device for gauging surface characteristics by measuring the leakage of fluid between a material surface and a gauging surface applied thereto.

It is an object of this invention to provide a gauging head especially arranged and adapted for checking the surface of a lithographic plate or similar surfaces by measuring fluid flow over a predetermined portion of such a surface.

It is a further object to provide a gauging head for gauging surface characteristics by measuring the leakage of fluid supplied under pressure to the head and escaping between a flexible gauging surface and the surface to be gauged, the gauging pressure being determined by the compression of a yielding support for the flexible gauging surface to a point determined by the engagement of stop means on the gauge head with the gauged surface, and the stop means engaging the gauged surface under a predetermined force determined by the weight of the gauging head, the stop means being so disposed as to stably support the head in position for gauging.

It is a further object to provide a gauging head wherein a flexible gauging surface or plate is applied under pressure to the surface to be gauged with the pressure being limited by the engagement of stop means engaging the gauged surface, the stop means and the gauging surface being the only portions of the gauging head contacting the work surface and being formed of a plastic material such as nylon which is abrasive resistant and has a soft action on metal surfaces, whereby the work surface is protected against abrasion and deformation during gauging.

It is a further object to provide a gauging head for gauging surface characteristics, the gauging head being self-supported in a stable manner on the surface of the material and having sufficient weight to maintain its gauging position and substantially flatten a sheet being gauged, those gauge head portions contacting the material being formed of a plastic material for protecting the characteristics of the gauged surface or sheet during gauging.

It is a further object to provide such a gauging head which is simply assembled from a few easily manufactured components and which is reliable for accurate gauging through a long service life.

Other objects and advantages of the invention will be apparent from the following description, the appended claims, and the accompanying drawing, in which, Figure 1 is a perspective view of a gauging head embodying the features of the present invention shown in gauging position and associated with an indicating instrument and a source of air under pressure, Figure 2 is a longitudinal central section of the gauging head in Figure 1, Figure 3 is a view of the lower end of the gauging head, Figure 4 is an enlarged portion of the sectional view of Figure 2, and Figure 5 is a fragmentary section showing the gauging plate or surface in engagement with the material being gauged.

The particular gauging head illustrated for the purpose of disclosing the present invention is adapted for measuring surface characteristics of materials by measuring the leakage flow between a gauging surface or plate and the surface to be gauged. The gauging surface adapts itself to the general contour of the surface while spanning finely spaced irregularities thereon. The gauging head as illustrated comprises a body having stop means or feet at one end for application to the material surface. A yielding member having a passage therethrough is carried centrally within the stop means at one end of the body and extends slightly beyond the stop means when free and compressed. A gauging plate at the outer surface of the yielding member has a narrow gauging surface around a central opening for engagement with the surface to be gauged. Air under pressure from a controlled source is led through the gauging head body and communicates with the passages through the member and plate. The weight of the body is sufficient to compress the yielding member to an extent limited by the stop means which serve to stably support the gauging head in position on a surface being gauged after its placement and release by the operator.

In order to render it unnecessary for the operator to hold the gauging head in position and press it against the work surface the gauging head of this invention has a body portion of a weight sufficient to compress the yielding washer to an extent limited by engagement of the feet with the surface being gauged, the feet serving to support the gauging head and flatten a material sheet if such is being gauged. Thus the operator's hands are completely free for recording data for the other operations. Also while the gauging surface engages the work under a predetermined gauging pressure determined by the limited compression of the yielding member the applied force of the stop means is determined by the weight of the head which is self-supporting. Thus these forces applied to the surface being gauged can be predetermined to avoid deformation and secure accurate gauging results.

In many applications to gauging surface finish or roughness, it has been found that metallic gauging head components deform and abrade the gauged surface. The grained surface of lithographic plates is a good example where such a condition occurs. Through the teaching of this invention those gauging head surfaces which engage the material are formed of an abrasive resistant plastic material having a soft action on metal. Nylon plastic has been found to be particularly suitable for such applications.

Referring more particularly to the drawing in which the same reference numerals are applied to like parts in the several views, Figure 1 illustrates a preferred form of the present invention as applied to gauging the graining characteristics of the surface of a lithographic plate 11 to determine the uniformity thereof and the printing characteristics of the plate. The substantially cylindrical body 10 of the gauging head is formed of an upper weight portion 12 and a lower pickup body or foot portion 14. The weight has an axial passage 15 opening into a cup-shaped recess 16 which has a threaded outer portion. The pickup body 14 is threaded into this depression and abuts the lower end of weight 12. Stop projections or feet 18 are provided on body 14 for engagement with the surface being gauged. These feet are spread sufficiently relative to the major dimensions of weight portion 12 of the gauging head body 10 to form a stable support therefor when the gauging head is in position for gauging. Note from Figure 2 that the center of gravity of the head is located above the foot portion 14 and lies along the vertical line of symmetry of the head.

A yielding member or washer 20 of substantially conical shape is cemented in a recess 21 within the feet 18 of body 14. This member can be formed of rubber or a like material. The opening through member 20 is in communication with the passage 25 formed axially in pickup body 14. As seen in Figure 4 the yielding member 20 normally extends slightly beyond the feet 18 when it is free and uncompressed.

A gauging plate 26 is cemented to the outer surface of member 20 and has a projecting rib or gauging surface 27 of limited area about the member opening provided for engagement with the material being gauged. Plate 26 is sufficiently flexible to conform to the general contour of the gauged surface while spanning finely spaced irregularities therein.

Tube 30 extends through passage 15 of weight 12 and is coupled at 31 to passage 25 in pickup body 14, thus being in communication with the opening through member 20 and plate 26. In assembling the head tube 30 is passed through weight 12 and coupled to pickup body 14 while the body and weight are disassembled, following which the body is attached to the weight 12 as illustrated.

Figure 1 illustrates an exemplary air circuit which can be utilized with this gauging unit. Air from a pressure source is supplied through a filter 34, a pressure regulator 35 and an indicating tube 36 to the flexible tube 30. The indicating tube 36 illustrated is of the type wherein the velocity of flow upward through the internal taper of a transparent tube positions a float therealong in accordance with the flow velocity as determined by the leakage through the gauging head.

In its application in gauging the gauging head is applied as seen in Figure 1. Gauging rib 27 is urged against the surface of plate 11 under the force of weight 12 to compress yielding member 20 to an extent limited by the engagement of feet 18 with the surface being gauged. Thus the gauging pressure is constant. The force applied by feet is also predetermined and the head is stably supported. In gauging sheet materials such as lithographic plates where waviness is common, the feet 18 under the force of weight 12 serve to substantially flatten the plate for gauging. The gauging head is thus adapted for placement upon a surface being gauged without the necessity for support by the operator. The head can be placed in position and released, freeing the operator for recording a reading or for other operations.

As previously mentioned, metallic gauging components produce deformation and abrasion on many delicate surfaces. This has been found especially true with lithographic plates where no matter how delicately applied, metallic gauging components produce deformation of the surface grains. In order to overcome this difficulty, pickup body 14 and gauging plate 26, which are the only gauging head surfaces contacting the material being gauged, are formed of a plastic which is non-abrasive and which has a soft action on metallic surfaces. It has been found that by using nylon plastic, for example, to form both pickup body 14 and plate 26 no matter how repeated the gauging operations no damage to the surface results. This in conjunction with the predetermined application forces prevents damage during gauging.

In view of the fact that gauging rib 27 is sufficiently flexible to conform to the general contour of the surface being gauged while spanning finely spaced irregularities therein, it will be seen that the leakage of air under pressure between this rib and the gauged surface will be determined by the surface characteristics of the material being gauged. Different surface characteristics of different portions of a common plate or portions of different plates will be detected by a variation in flow through the indicating tube 36 as indicated by the plate therein. Calibrated scales can be provided, calibrated, for example, in terms of rate-of-leakage.

Thus it will be seen that an extremely compact and simply conformed gauging head has been provided for measuring surface characteristics. Through provision of the weight portion and the arrangement of the stop means, the gauging head itself is located and supported in a stable manner while serving to flatten sheet materials when such materials are gauged while maintaining constant a gauging pressure between the projecting gauging rib and the gauged surface. The operator is freed for recording instrument reading or other operations without the necessity of supporting the gauging head manually. Through the provision of the non-deforming feet and gauging surface, abrasion and deformation of lithographic plates and similar products have been eliminated, making possible the gauging of the surface characteristics of the most delicate materials without damage thereto.

While the form of apparatus as herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging head of the character described for gauging the surface of a lithographic sheet or the like, comprising a body having a downwardly extending substantially non-yielding foot portion for supporting the head on the sheet, the center of gravity of the head being located above said foot portion and lying along the vertical line of symmetry of the head so that the head is stably supported during gauging, a yielding member within said foot portion having a passage therethrough, the member extending slightly beyond said foot portion when free and uncompressed, a means providing flexible gauging surface of limited area about the outlet of the member for application to gauged sheet, the weight of the head being sufficient to compress the member until the gauging surface is substantially in the plane of the lower surface of the foot portion, whereby the pressure of the gauging surface and foot portion against the sheet are the same with each gauging operation, passage means in the body in communication with the member passage and adapted for connection to a source of fluid under pressure, the surfaces of the gauging head which engage the sheet being formed of an abrasive resistant material having a soft action on metal surfaces.

2. A head adapted for gauging surface characteristics through measurement of fluid leakage between the surface being gauged and a gauging surface applied thereto, the head comprising a body having downwardly extending substantially non-yielding feet at one end thereof for stably supporting the head on the surface to be gauged, passage means through said body terminating in the lower body end within the extended feet and adapted for connection at its upper end with a source of air under pressure and air gauging means, a yielding member connected at said lower body end within the body feet having a passage in communication with the passage means and normally extending beyond said feet when free and uncompressed, a flexible plate sealed to the outer end of said member having an opening therein in communication with the member passage and having a gauging surface of limited area on its outer surface around said opening, the gauging surface being adapted to conform to the general contour of the material being gauged while spanning finely spaced irregularities in the surface thereof, the head being of a weight sufficient to maintain the feet in uniform engagement with a surface to be gauged, and the gauging pressure between the gauging surface and the gauged surface being determined by the compression of said yielding member as limited by the engagement of the feet with the gauged surface and the feet engaging the gauged surface under a predetermined force, the lower part of the feet and the flexible plate being formed of a plastic material having a soft, nonabrading action on metal surfaces, whereby delicate gauged surfaces are protected against abrasion and deformation.

3. A head for gauging surface characteristics through measurement of fluid leakage between the surface to be gauged and a gauging surface applied thereto, comprising an elongated metal body having a passage axially therethrough, a substantially non-yielding plastic foot portion detachably connected to the lower end of the body having a hole therethrough aligned with the body passage, extended feet along the outer edge of said foot portion for engagement with the surface to be gauged, a yielding member connected to the lower end of the foot portion within the extended feet and extending therebeyond when free and uncompressed, a flexible plate sealed to the outer end of said member having an opening therein in communication with the hole through the member and having an outer gauging surface of limited area around said opening for application to a surface to be gauged, a flexible tube extending through the body passage, detachable coupling means at the lower end of the tube connecting the tube to the hole through the foot portion, said tube being adapted for connection at its other end to a source of air under pressure and an air gauge.

4. A head adapted for placement on a horizontal sheet material and location by gravity for gauging surface characteristics of the sheet through measurements of fluid leakage between the surface to be gauged and a gauging surface applied thereto and spanning finely spaced irregularities thereon, the head comprising an elongated weight member having an axial passage opening into a recess in the lower member end, a substantially non-yielding pickup body detachably fixed to the lower end of the weight member and having spaced axially extended stop projections thereon for engagement with the sheet to be gauged under the force of the weight member for stably supporting the gauging head and maintaining the sheet in a substantially flattened condition for gauging, the pickup body having a central passage therethrough, a yielding member cemented to the lower face of said pickup body centrally within said stop projections and having a passage in communication with the pickup body passage, said member normally extending beyond said stop projections when free and uncompressed, a flexible plate cemented to the outer end of the yielding member having an opening therein in communication with the member passage and a projecting rib on its outer surface extending around said opening, the rib being provided for application to the surface being gauged to conform to the general contour thereof while spanning finely spaced irregularities thereon under a gauging pressure determined by the compression of the yielding member as limited upon engagement of the stop projections with the gauged surface, a tube leading through the passage of the weight member, detachable coupling means connecting said tube to the passage within the pickup body, said coupling means being disposed within the weight member recess, said tube being adapted at its upper end for connection to a source of air under pressure and an air gauge responsive to leakage between the projecting rib and the surface being gauged.

References Cited in the file of this patent
UNITED STATES PATENTS

| | | |
|---|---|---|
| 2,493,233 | Dower | Jan. 3, 1950 |
| 2,618,964 | Byrkett | Nov. 25, 1952 |

FOREIGN PATENTS

| | | |
|---|---|---|
| 215,694 | Switzerland | Oct. 16, 1941 |